(12) United States Patent
Zielinski

(10) Patent No.: US 7,419,340 B2
(45) Date of Patent: Sep. 2, 2008

(54) DRAIN CLEANING APPARATUS

(76) Inventor: Artur Zielinski, 670 NE. 56th Ct., Fort Lauderdale, FL (US) 33334

( * ) Notice: Subject to any disclaimer, the term of this patent is extended or adjusted under 35 U.S.C. 154(b) by 307 days.

(21) Appl. No.: 11/162,419

(22) Filed: Sep. 9, 2005

(65) Prior Publication Data
US 2007/0059115 A1    Mar. 15, 2007

(51) Int. Cl.
*B23Q 11/00* (2006.01)

(52) U.S. Cl. ............... 409/137; 409/135; 409/136; 198/371.1; 210/413

(58) Field of Classification Search ............ 409/131, 409/135, 136, 137, 145; 408/67; 82/901; 100/117; 451/453; 198/371.1, 371.2, 371.3, 198/494, 362, 495, 657, 670, 671, 675; 209/243, 209/244, 245, 254; 29/DIG. 50, DIG. 53, 29/DIG. 61, DIG. 73, DIG. 77, DIG. 79, 29/DIG. 94, DIG. 95, DIG. 98, DIG. 99, 29/DIG. 100, DIG. 102; 210/413, 414, 415, 210/744, 783, 800, 803, 387
See application file for complete search history.

(56) References Cited

U.S. PATENT DOCUMENTS

| | | | | |
|---|---|---|---|---|
| 4,445,910 A | * | 5/1984 | Zimmerman | 48/76 |
| 5,165,432 A | * | 11/1992 | McKibben | 134/65 |
| 5,205,686 A | * | 4/1993 | de Caussin | 409/131 |
| 5,251,828 A | * | 10/1993 | Jacobs et al. | 241/14 |
| 5,257,586 A | * | 11/1993 | Davenport | 110/246 |
| 5,542,348 A | * | 8/1996 | Bendzick | 100/37 |
| 5,586,848 A | * | 12/1996 | Suwijn | 409/137 |
| 5,664,492 A | * | 9/1997 | Bendzick | 100/45 |
| 6,174,446 B1 | * | 1/2001 | Andresen et al. | 210/744 |
| 6,299,082 B1 | * | 10/2001 | Smith | 241/186.35 |
| 6,325,203 B1 | * | 12/2001 | Guliana | 198/670 |
| 6,461,523 B1 | * | 10/2002 | Greenrose | 210/770 |
| 6,571,959 B1 | * | 6/2003 | Moore et al. | 210/394 |
| 2002/0166911 A1 | * | 11/2002 | Rajewski | 241/236 |
| 2005/0082144 A1 | * | 4/2005 | Maupin et al. | 198/659 |
| 2006/0049112 A1 | * | 3/2006 | Moore | 210/695 |

* cited by examiner

*Primary Examiner*—Dana Ross

(57) ABSTRACT

Disclosed is a method and an apparatus for removing by-product chips, in existing CNC machining center. The apparatus is using parasite driven rotating carousel, capable of moving chips away from the drain of an existing machine. There is a possibility of installing powered feed device with its own controller in case the machine is not equipped with the auger. The method of removing chips is based on shape of the apparatus and the parasite drive, which uses existing machine auger. This auger is normally used to remove chips from the machine into an external collection unit. The apparatus allows operating the machine without interruption, otherwise when such apparatus is not used, chips clog drain holes forcing the machine operator to stop the machine for periodic drain cleaning. The auger itself does not protect the drain from being clogged. The drain cleaning apparatus can be used in the machines of different size. Such apparatus allows for a continuous operation and dramatically improves machine's performance due to the prevention of the drain clog and incessant circulation of coolant.

1 Claim, 2 Drawing Sheets

Figure 1:
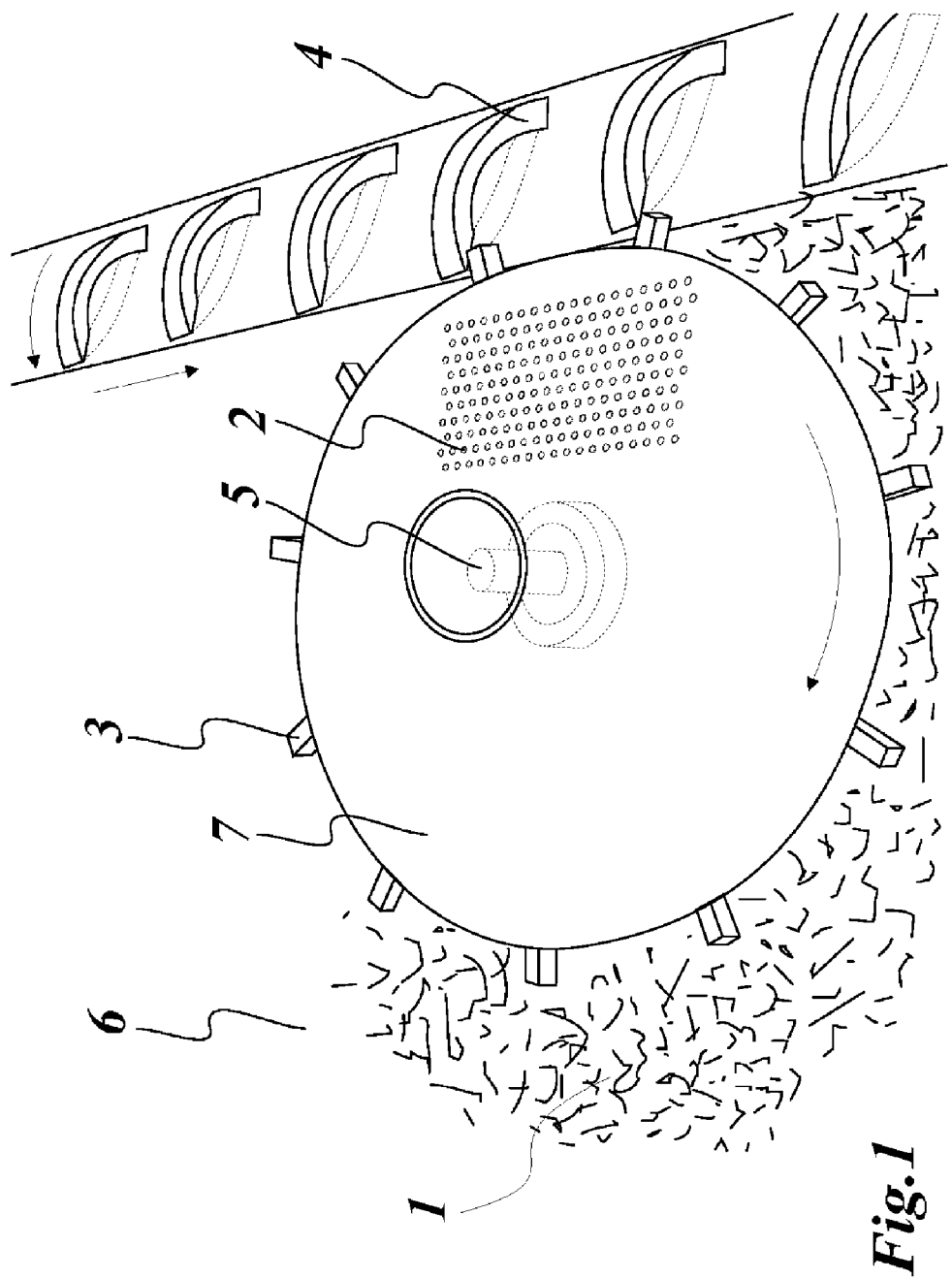

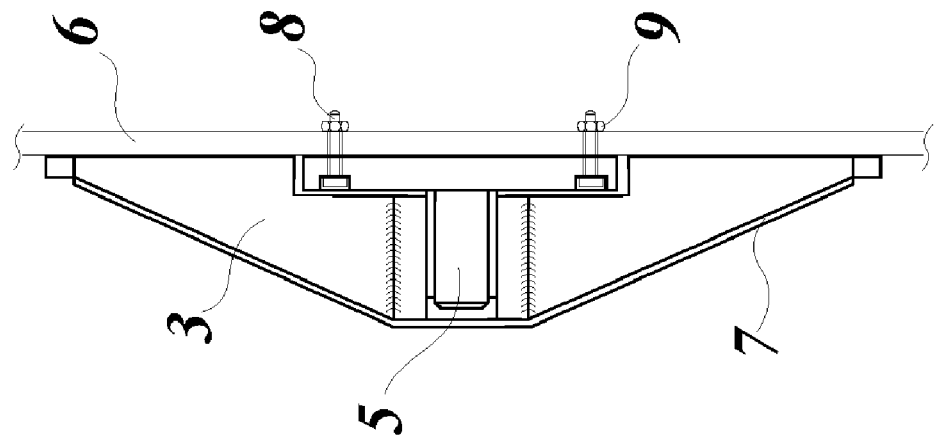
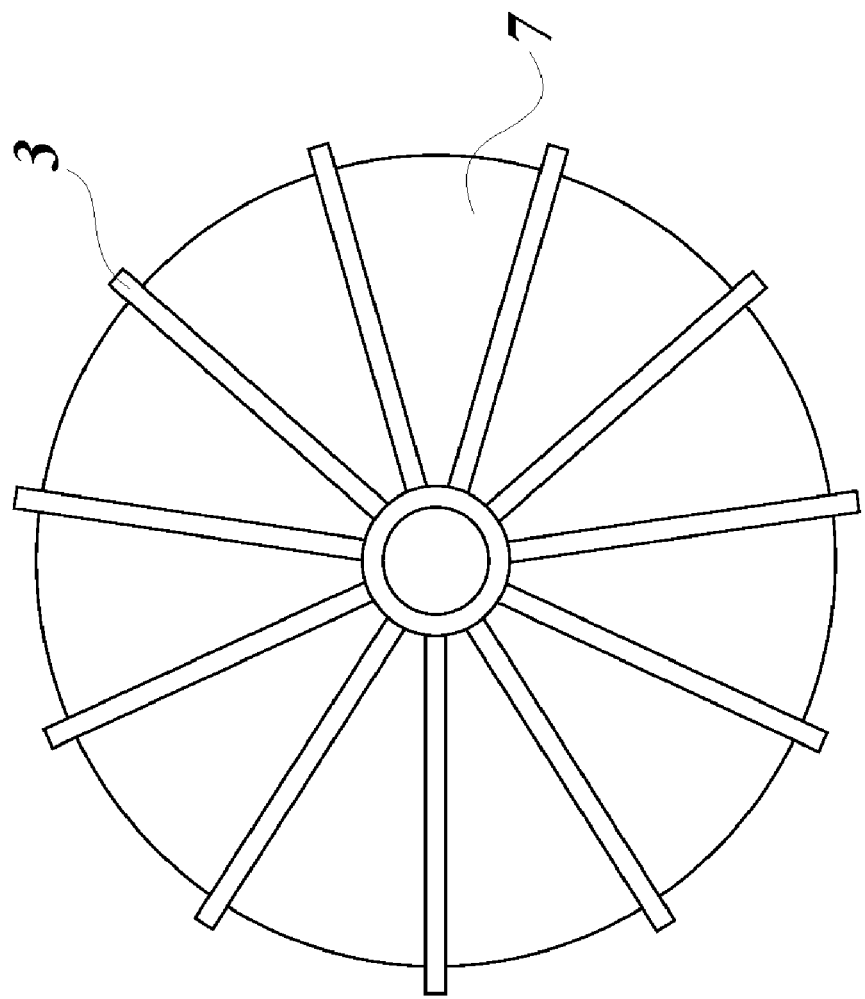

DRAIN CLEANING APPARATUS

This invention improves performance of existing machine center such as CNC machine tool called "Computer Numeric Control Machine" (hereinafter called "CNC machine center"). Such a machine in most cases produces a volume of metal and/or plastic chips as the work-piece is milled. At the present time such a machine uses auger to remove chips from the machine to the external waste container. During machining process such a machine uses a liquid coolant stored in the machine tank for repeated use, and directs coolant into the cutting flutes of the tool. The coolant and chips are collected on the machines slopped bottom surface allowing said coolant and chips to move to the lower part of said surface equipped with numeric controlled chip remover know as auger. The drain is formed of multitude of holes in the bottom surface of the machine, of the similar diameter as produced chips. These chips have a tendency to clog the holes of the drain stopping the coolant from being freely drained from the machine to the coolant tank for repetitive use. Said apparatus eliminates this problem by keeping produced chips away from machine drain, at the same time allowing the coolant to be drained.

The precision of machining is very important for CNC machining center. There are varieties of tools used and plenty of coolant is delivered to provide optimum cooling of the cutting zone as well as heat dissipation from machining work to maintain required tolerance. It is imperative to keep coolant flow incessant.

SUMMARY OF THE INVENTION

In the process of work on CNC machining centers, the inventor has found that long process of complex 3 D machining allows chips to clog the drain. A pump supplies coolant to the cutting edge via coolant nozzle. Plenty of light chips are carried to the drain by the used coolant returned to the coolant tank located under the lowest part of the machine surface. Liquid coolant penetrates holes of said drain, easily leaving numerous chips behind. Those chips can form tight pile, which permanently clogs the drain. Such clogged drain does not allow coolant to move freely to the coolant tank, causing coolant level to increase rapidly and the pressure of supplied coolant to decrease. In the worst case the coolant is trapped in machine causing the coolant tank to get empty and stopping the cooling process. The present invention has been made to intrinsically avoid the problem described above.

The general idea of the invention is to provide a method and apparatus for chip removal from drain surface of CNC machine using existing auger drive. The auger is a spiral screw conveyor with its own drive, which includes electric motor, and a reduction gear with a clutch. The auger may be controlled manually from a console or digitally by the program (hereinafter called "NC program"). The auger is configured to rotate continuously with very slow RPM (rotation per minute) clockwise and counterclockwise. Digital controller allows operator to permit or prohibit of the operation by the auger NC program.

1. FIELD OF THE INVENTION

The present invention relates to a machine drain chips removal system.

2. DESCRIPTION OF THE RELATED ART

This invention improves performance of existing machine center such as CNC machine tool called "Computer Numeric Control Machine" (hereinafter called "CNC machine center"). Such machine in most cases produces a volume of metal and/or plastic chips as the work-piece is milled. At the present time such machine uses auger to remove chips outside the machine to the external waste container. During machining process such machine uses a liquid coolant stored in the machine tank for repeated use, and directs coolant into the cutting flutes of the tool. The coolant and chips are collected on the machines slopped bottom surface allowing said coolant and chips to move to the lower part of said surface equipped with digitally controlled chip remover know as auger. The drain is formed of multitude of holes in the bottom surface of the machine, of the similar diameter as produced chips. These chips have a tendency to clog the holes of the drain stopping the coolant from being freely drained from the machine to the coolant tank for repetitive use. Described apparatus eliminates this problem by keeping produced chips away from machine drain, at the same time allowing the coolant to be drained.

The precision of machining is very important for CNC machining center. There are varieties of tools used and plenty of coolant is delivered to provide optimum cooling of the cutting zone as well as heat dissipation from machining work to maintain required tolerance. It is imperative to keep coolant flow incessant.

3. DETAILED DESCRIPTION OF DRAWINGS

In the drawings, closely related figures have the same numbers but different alphabetic suffixes.

FIG. 1 shows the perspective view of the apparatus.

FIG. 2a and FIG. 2b show the bottom and side view of the apparatus respectively. The apparatus is shown in the position covering drain holes 2 (FIG. 1). The apparatus rotates on the axle 5, which is mounted on the machine drain surface 6 with screws 8 and nuts 9. The parasite drive is accomplished by carousel arms 3, which are propelled by the machines spiral auger 4 (FIG. 1). The liquid coolant flows to the drain 2 under the said apparatus while chips 1 (FIG. 1) are driven away by the conical hood 7 of the apparatus. The shape of the hood 7 presented at FIG. 2b prevents chips 1 from staying on the hood 7, pushing them away from the apparatus preventing clogging of the drain 2 and allowing coolant to be distributed from the machine reservoir for repeated use.

What is claimed is:

1. An apparatus for removing chips from a drain of an existing CNC machine including an auger, said apparatus comprising:

a carousel having a center and a multitude of arms fitting a pitch of said auger of said machine;

an axle mounted in a center of said carousel and a floor of said machine such that at least one of said multitude of arms is engaged in said auger for producing rotational motion of said carousel and a conical hood mounted centrally on said carousel causing said chips to be driven away from said center of said carousel.

* * * * *